United States Patent [19]

May

[11] Patent Number: 5,650,228
[45] Date of Patent: Jul. 22, 1997

[54] REPLACEMENT SURFACE FOR BATHTUB AND SHOWER FLOOR

[76] Inventor: Michael W. May, P.O. Box 697, Sandia Park, N. Mex. 87047

[21] Appl. No.: 551,155

[22] Filed: Oct. 31, 1995

[51] Int. Cl.⁶ .................... A47K 3/02; B32B 7/12
[52] U.S. Cl. .................... 428/351; 4/580; 4/582; 4/583
[58] Field of Search .................... 4/583, 582, 580; 428/354, 351; 156/94

[56] References Cited

U.S. PATENT DOCUMENTS

| | | | |
|---|---|---|---|
| 3,593,347 | 7/1971 | Nemiroff | 4/197 |
| 3,614,793 | 10/1971 | Nemiroff | 4/173 |
| 4,043,853 | 8/1977 | Saladino | 156/94 |
| 4,067,071 | 1/1978 | Altman et al. | 4/145 |
| 4,126,719 | 11/1978 | Koyanagi et al. | 428/35 |
| 4,158,585 | 6/1979 | Wright | 156/94 |
| 4,511,621 | 4/1985 | Thomas et al. | 428/285 |
| 4,625,344 | 12/1986 | Howard | 4/583 X |
| 4,931,330 | 6/1990 | Stier et al. | 4/583 X |
| 5,308,271 | 5/1994 | Foulke | 4/583 X |
| 5,330,811 | 7/1994 | Buchalter | 428/40 |

OTHER PUBLICATIONS

Structoglas Advertisement for wall and ceiling panels, Sequentia, Incorporated, Bulletin 2102–B1.
IPS Corporation material safety data sheet, revised Mar. 1995 (supersedes Jan. 1994).

*Primary Examiner*—Daniel Zirker
*Attorney, Agent, or Firm*—Deborah A. Peacock; Jeffrey D. Myers

[57] ABSTRACT

A replacement surface for bathtub and shower floors comprising a liner covering substantially the entire bottom interior surface of the bathtub or shower with a peripheral relief allowing access to a drain and conforming surface irregularities of the bottom interior surface to present a top surface with a relatively smooth contour, and a self-curing, waterproof adhesive layer which envelops and seals any cracks on the bottom interior surface and promotes an intimate bond between the liner and the bottom interior surface.

7 Claims, 2 Drawing Sheets

1-1

2-2

REPLACEMENT SURFACE FOR BATHTUB AND SHOWER FLOOR

BACKGROUND OF THE INVENTION

1. Field of the Invention (Technical Field)

The present invention relates to a replacement surface for bathtub and shower floors.

2. Background Art

A number of different approaches have been taken to alter the aesthetic appearance or to repair defects in the floor of a bathtub or shower. The common theme found in the existing art is a large capital investment in equipment or time to accomplish a successful renovation. Most of the existing technology involves completely covering all of the existing bathtub or shower surfaces. This is accomplished in numerous manners, including molding, vacuum molding, and hand lay-up.

Molding and vacuum molding can involve large outlays in equipment to perform the processes involved in creating a new bathtub surface. Also, the hand lay-up of numerous plies of material and resin involve a tremendous amount of labor and skill. Besides involving a large capital outlay, the present methods also provide a finished surface that is smooth, which becomes slippery when wet and soapy. Further, these methods generally provide thin, structurally weak coverage of the existing bathtub or shower floor. Also, the material used in these applications are susceptible to mold, mildew and fungus.

Other present technology that does not seek to cover the entire bathtub or shower surface also has many of the same characteristics. By covering only a fraction of the bathtub floor, these methods lack aesthetic appeal. For this same reason, there can be only minor improvements in structural stability. These methods produce a multi-level tub bottom, thus raising safety concerns. Finally, these methods use epoxies in the bonding process which are very brittle and tend to crack.

The present invention seeks to solve the deficiencies of the present technologies by providing an inexpensive, quick to install, permanent, structurally enhanced yet resilient, aesthetically-pleasing and biomedically sound replacement surface for a bathtub or shower floor.

SUMMARY OF THE INVENTION

The present invention comprises apparatuses and methods for a replacement surface for a bathtub or shower floor which improves functionality and aesthetics. The invention comprises: providing a multi-layered liner covering substantially the entire bottom interior surface of a bathtub or shower; preparing the bottom interior surface of the bathtub or shower; applying an adhesive layer to the bottom surface of the liner; aligning the liner within the bottom interior surface; curing the adhesive layer; and finishing the exposed surfaces of the bottom interior surface and the liner.

In the preferred embodiment, the liner has a peripheral relief to allow access to a drain. The liner also conforms surface irregularities of the bottom interior surface to present a top surface not markedly affected in contour by these surface irregularities. Also, the top surface of the liner comprises a non-skid texture while the bottom surface of the liner comprises a smooth surface. The uppermost layer of the liner has biomedically sound qualities, and is preferably resin with fiberglass rovings. The lowermost layer of the liner is preferably a resin fiberglass mixture.

Applying an adhesive layer to the bottom surface of the liner is preferably accomplished by applying Weld-On No. 10. The adhesive layer is preferably waterproof and self-curing, and envelopes any cracks in the interior bottom surface of the bathtub or shower. The adhesive layer has non-brittle qualities.

Aligning the liner within the bottom interior surface of the bathtub or shower improves the aesthetic appeal of the replacement surface. Curing the adhesive layer allows it to dry and promotes a strong bond between the liner and the bottom interior surface of the bathtub or shower. The resulting permanent bond enhances the structural stability of the bathtub or shower floor. Finishing the exposed bottom interior surface of the bathtub or shower and the exposed surfaces of the liner improves the aesthetics and functionality of the replacement surface.

An object of the present invention is to provide a permanent replacement surface for a bathtub or shower floor.

An advantage of the present invention is to inexpensively and quickly enable the bottom interior surface of a bathtub or shower to be replaced.

Another advantage of the present invention is the low cost of materials and labor and the pleasantly appealing aesthetics.

A further object of the present invention is to provide a replacement surface for a bathtub or shower floor which is biomedically sound and promotes safety.

An advantage of the present invention is that the liner is made from stock materials which resist mold, mildew, and fungus and which provide a non-skid top surface.

Another object of the present invention is to enhance the structural stability of the bathtub or shower floor.

Yet another object of the present invention is that the replacement surface can be applied to many different bathtub or shower floor surfaces, such as fiberglass, acrylic, porcelain, steel, and cement.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the preferred embodiment of the present invention and, together with the description, serve to explain the principles of the invention. The drawings are only for the purposes of illustrating a preferred embodiment of the invention and are not to be construed as limiting the invention.

DESCRIPTION OF THE PREFERRED EMBODIMENTS

(Rest Modes for Carrying Out the Invention)

The present invention is a replacement surface for bathtub and shower floors comprising a liner covering substantially the entire bottom interior surface of the bathtub or shower which conforms to the surface irregularities of the bathtub or shower floor to present a top surface having a relatively smooth contour, and a waterproof, self-curing adhesive for bonding and adhering the bottom surface of the liner to the top surface of the bathtub or shower floor and sealing any cracks in the bathtub or shower floor.

For purposes of the specification and claims, the term "floor" includes the bottom interior surface of a bathtub or shower. The term "surface irregularities" includes waves, undulations, and other flaws, imperfections, and defects of the bottom interior surface of the bathtub or shower. Also, the term "biomedically sound" includes a material that resists mold, mildew, fungus, and may be approved for hospital applications.

The present invention has, among other objects, the ability to improve the functionality of a bathtub or shower floor by sealing any cracks that may exist in the floor and by conforming any irregularities and undulations to present a relatively smooth contour on the top surface of the liner. Also, the structural stability of the bathtub or shower floor is enhanced by the replacement surface. Further, the present invention provides a permanent, aesthetically pleasing replacement surface for bathtubs or showers. The bond between the liner and the interior bottom surface of the bathtub or shower can withstand constant loading and unloading and still maintain an excellent bond due to its non-brittle qualities. Finally, the present invention provides a quick, easy, and inexpensive alternative for those consumers interested in replacing their bathtub or shower floor.

Figure 1:
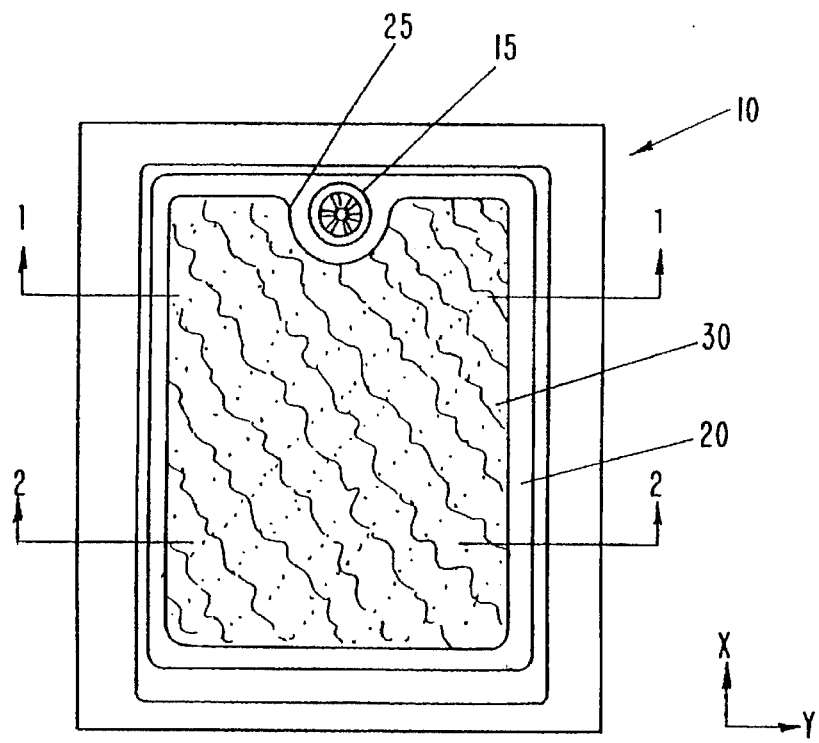
FIG. 1 shows the preferred embodiment installed on a bathtub or shower floor.

With reference to FIG. 1, the preferred embodiment of the present invention provides liner 30 for bottom interior surface or floor 20 of bathtub 10. Liner 30 covers substantially the entire bottom interior surface 20, and includes peripheral relief 25 allowing access to drain 15. FIG. 1 shows a typical bathtub arrangement wherein drain 15 is at the upper end of the bathtub. For shower applications, the drain is usually in the center. Liner 30 is preferably disposed very near to drain 15 for aesthetic purposes. Drain 15 may be removed and replaced with a matching color acrylic or fiberglass drain for aesthetic purposes. Liner 30 is generally rigid, but is flexible enough to conform to the slight curvatures found in most bathtubs and showers. Liner 30, in the drawings, is shown as a three-layer embodiment (two structural layers 40 and 50 and one adhesive layer 60). One or more structural layers may be utilized. The layers shown are not to scale and are for illustrative purposes only.

Liner 30 can be pre-formed to fit within the standard size bathtub and shower, or it can be individually fitted to any non-standard size. Individually fitting liner 30 involves drawing the bathtub floor 20 to make a template. The template is then used as a guide to create, by routing or other equivalent means, liner 30 from a blank sheet of material. Most preferably, the material liner 30 can be formed from stock sheet of material. The preferred stock material is Structoglas® sanitary wall and ceiling panels made by Sequentia Incorporated. This material is a composite, with a textured top surface, likely made of polyester resin with fiberglass rovings, and a smooth molded bottom surface, likely made of polyester resin and fiberglass. Another stock material, useful in the present invention is a more expensive material, also made by Sequentia Incorporated, in which resin is shot into a mold, then resin with fiberglass is shot into the mold as a second layer. Another stock material useful is a rubberized plastic mylar material made by 3M, which has a non-skid surface. Other equivalent materials may be used. The cost of liner 30 is reduced by using a stock material. Also, stock materials generally have more consistent properties, such as thickness, durability, contour, and surface finish.

Figure 4:
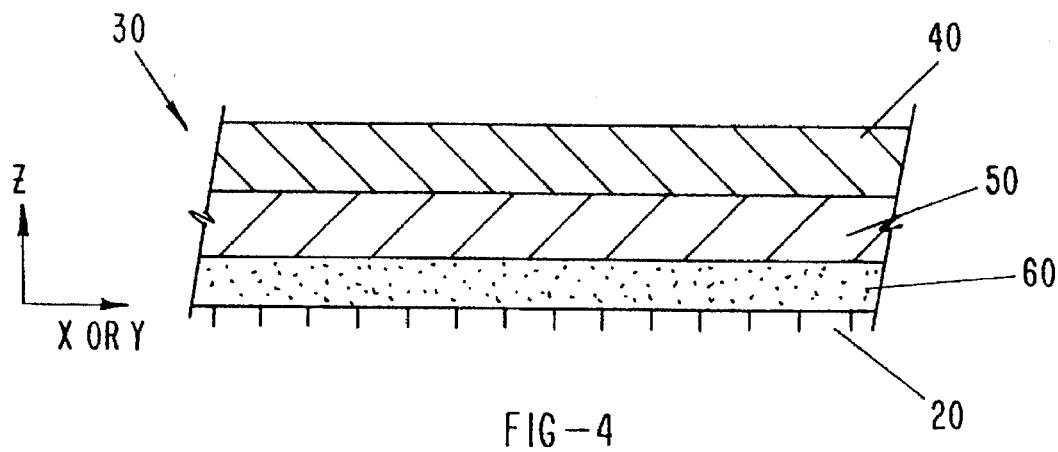
FIG. 4 shows a detailed cross section of the preferred embodiment of the present invention.

Referring to FIG. 4, liner 30 comprises a composite larger or a plurality of layers. Uppermost layer 40 preferably comprises a polyester resin with fiberglass rovings, while lowermost layer 50 preferably comprises a polyester resin fiberglass mixture. The resin has biomedically sound qualities, such as resistance to mold, mildew, and fungus. Further, resin is approved for hospital applications and is very durable, resulting in a long life for a permanent application such as this. Fiberglass provides the best bond to adhesive layer 60 when used in combination with the preferred adhesive, as discussed below. Other equivalent materials may also be used. Preferably, the top surface of liner 30, which is equivalent to the top surface of uppermost layer 40, has a non-skid texture. This texture is found on the stock material as purchased, once again saving time and expense. The non-skid texture provides a non-slippery surface to stand on when wet and soapy. This helps to promote a safer environment when taking a shower or bath. The bottom surface of liner 30, which is equivalent to the bottom surface of lowermost layer 50, preferably has a relatively smooth surface. This smooth surface enables liner 30 to be placed on and maneuvered about another surface with relative ease. Also, the smooth surface allows adhesive layer 60 to be applied more easily with more consistent coverage. All of this promotes a quick, easy, and inexpensive installation.

Before adhering liner 30 to the floor of bathtub 10, bottom interior surface 20 of bathtub 10 is prepared by sanding or equivalent means of surface finishing and then cleaned to produce a dirt-free surface to aid in bonding liner 30 to bathtub floor 20. Liner 30 is cleaned to insure a good bond. Adhesive layer 60 is applied to the bottom surface of liner 30, which also corresponds to the bottom surface of lowermost layer 50. In the preferred embodiment, adhesive layer 60 is disposed on substantially the entire bottom surface of liner 30. Equivalent results may be obtained, however, when adhesive layer 60 covers less than substantially the entire bottom surface of liner 30. In an alternate embodiment, adhesive layer 60 covers only the middle section of the bottom surface of liner 30.

Liner 30 is then placed on bottom interior surface 20 of bathtub 10 and aligned such that it is spaced evenly within bottom interior surface 20. This improves the aesthetic appearance of liner 30. Pressure is then applied to liner 30 by standing on it, or any equivalent means of applying force to its top surface, in order to eliminate any air bubbles and to insure a smooth contour on the top surface of liner 30. Applying pressure to the top surface of liner 30 also insures that the bottom surface of liner 30, the adhesive layer 60, and the top surface of bottom interior surface 20 are in intimate communication with each other, thus creating a strong bond. Adhesive layer 60 is then given time to cure, thus further promoting a strong bond between liner 30 and bottom interior surface 20 of bathtub 10. A cure time of 4 hours has been found to be effective.

Preferably, adhesive layer 60 comprises a two part adhesive known as Weld-On No. 10, an acrylic resin/methyl methacrylate monomer, made by IPS Corporation of Gardena, Calif. This has been found to work best for the combination of bathtub 10 made of fiberglass and lowermost layer 50 of liner 30 made of fiberglass. However, other equivalent adhesives may also give similar results, such as silicone or a catalytic adhesive or epoxy. In alternate embodiments, such as where lowermost layer 50 of liner 30 is made of acrylic, adhesive layer 60 of Weld-On No. 10 is useful. Similarly, in second and third alternate embodiments of the present invention, bathtub 10 is made of porcelain or cast iron and adhesive layer 50 is two-sided adhesive, such as 3M Acrylic Tape. In a fourth alternate embodiment, a bathtub 10 of concrete and adhesive layer 50 of Weld-On No. 10 are used. Other similar combinations of bathtub 10, adhesive layer 50, and lowermost layer 50 of liner 30 may obtain equivalent results.

Once adhesive layer 60 is cured and is dry, bottom interior surface 20 and liner 30 may be finished to blend together using an acrylic/polyester paint or other equivalent paint, thus insuring aesthetic appeal. Finishing may also involve applying caulking, silicone, or other equivalent material around the edges of liner 30 to blend it into bottom interior surface 20 and to improve the waterproof seal around its edges.

Figure 2:
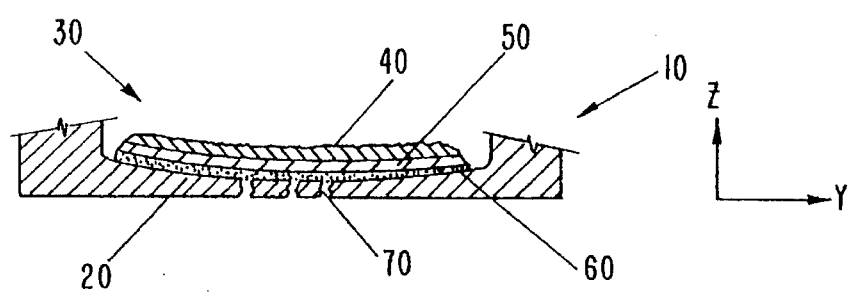
FIG. 2 depicts the preferred embodiment installed on a bathtub or shower floor having cracks at cross section 1—1 from FIG. 1.

FIG. 2 shows the present invention in a primary application covering and sealing cracks 70 in bottom interior surface 20 of bathtub 10. Adhesive layer 60 completely surrounds crack 70 in all directions. By thus enveloping crack 70, and because of the intimate bond between liner 30, adhesive layer 60, and bottom interior surface 20, crack 70 is not exposed to any water which may be in bathtub 10. Thus any leakage problem will be solved. Further, adhesive layer 60 may fill or partially fill crack 70, producing the same results. Also, the combination of adhesive layer 60 sealing off crack 70 and forming an intimate bond between the bottom surface of liner 30 and bottom interior surface 20, results in a structurally strengthened bathtub floor.

Figure 3:
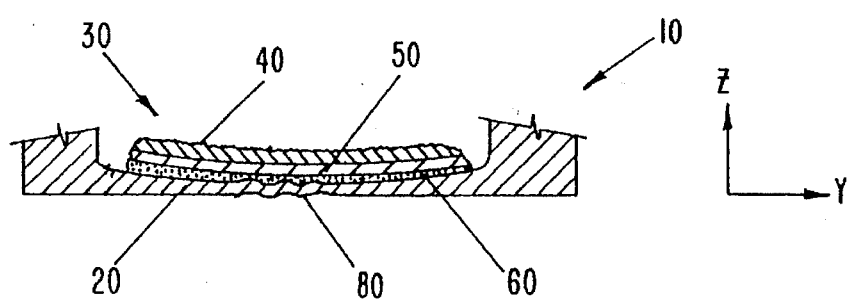
FIG. 3 illustrates the preferred embodiment installed on a bathtub or shower floor having surface irregularities and undulations at cross section 2—2 from FIG. 1.

Referring to FIG. 3, the present invention is shown as applied to bottom interior surface 20 containing surface irregularities 80. These irregularities may take the form of waves, undulations, or any similar disruption of the surface contour of bottom interior surface 20. Liner 30 bridges surface irregularities 80 and conforms them such that the top surface of liner 30 presents a relatively smooth contour as compared to surface irregularities 80. Similar to the discussion above regarding FIG. 2, this application enhances the functionality of bathtub 10. Liner 30 presents a top surface with a smooth contour, thereby increasing safety, structural stability, and aesthetic appeal of the replacement surface.

Figure 5:
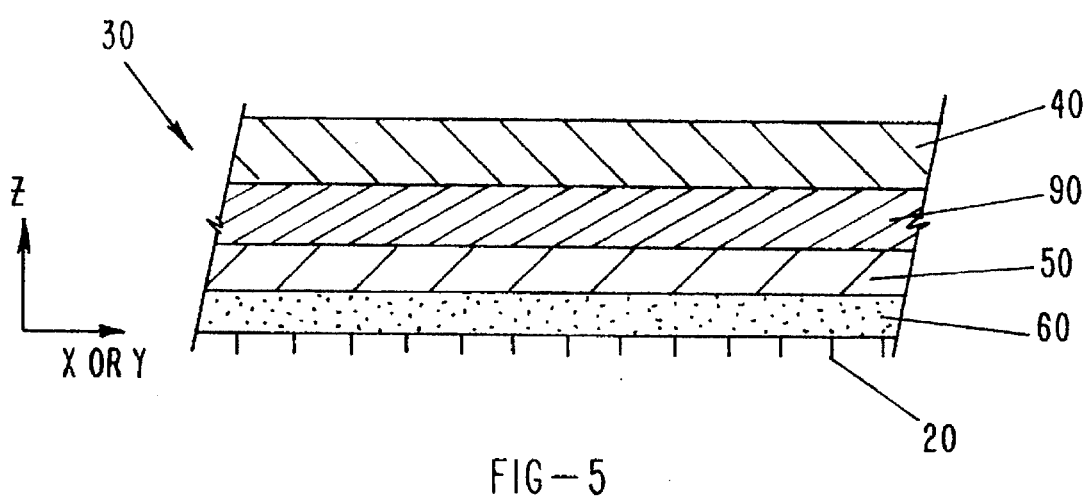
FIG. 5 illustrates a detailed cross section of an alternate embodiment of the present invention.

FIG. 5 shows an alternate embodiment of the present invention. All of the above characteristics of the present invention also hold true for this embodiment, the main difference being middle layer 90 in liner 30. Middle layer 90 comprised of a structural material, such as steel, structural fiberglass, or screen, helps to increase the structural stability of the liner 30 and of the replacement surface. Other equivalent materials may also be used.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A replacement surface for applying to an interior bottom surface of a bathtub or shower and adapted to conform and seal undulations and defects in the bathtub or shower to present at the upper surface of the replacement surface a substantially smooth contour, comprising:

a liner comprising a plurality of resin-containing structural layers;

a lowermost layer of the plurality of layers serving to provide a bottom surface for adhesion to the interior bottom surface of the bathtub or shower;

an uppermost layer of the plurality of layers serving to provide a biomedically sound upper surface having a non-skid texture; and an adhesive layer disposed on a bottom surface of the lowermost layer of the plurality of layers serving to adhere said liner to the interior bottom surface of the bathtub or shower, said adhesive layer comprising a waterproof adhesive whereby any cracks in the interior bottom surface of the bathtub or shower are enveloped and sealed.

2. A replacement surface as recited in claim 1, wherein the uppermost layer of the plurality of layers is resin with fiberglass rovings.

3. A replacement surface as recited in claim 1, wherein the lowermost layer of the plurality of layers is a resin and fiberglass mixture.

4. A replacement surface as recited in claim 1, wherein said adhesive layer comprises a self-curing adhesive.

5. A replacement surface as recited in claim 1, wherein said liner substantially covers the entire interior bottom surface of the bathtub or shower.

6. A replacement surface as recited in claim 1, wherein said liner further comprises a peripheral relief exposing a drain of the bathtub or shower.

7. A replacement surface as recited in claim 1, further comprising a middle layer comprising one of the materials selected from the group of materials consisting of steel, structural fiberglass or screen.

* * * * *